US012671769B2

(12) United States Patent
Miyajima

(10) Patent No.: US 12,671,769 B2
(45) Date of Patent: Jun. 30, 2026

(54) INSPECTION APPARATUS, CONTROL METHOD, INSPECTION SYSTEM, AND STORAGE MEDIUM FOR PERFORMING INSPECTION OF A PRINTED SHEET

(71) Applicant: CANON KABUSHIKI KAISHA, Tokyo (JP)

(72) Inventor: Jun Miyajima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 18/523,679

(22) Filed: Nov. 29, 2023

(65) Prior Publication Data
US 2024/0179247 A1 May 30, 2024

(30) Foreign Application Priority Data

Nov. 30, 2022 (JP) ................................. 2022-191504

(51) Int. Cl.
H04N 1/00 (2006.01)
(52) U.S. Cl.
CPC ..... *H04N 1/00029* (2013.01); *H04N 1/00015* (2013.01); *H04N 1/0005* (2013.01); *H04N 1/00063* (2013.01); *H04N 1/00082* (2013.01); *H04N 1/0009* (2013.01); *H04N 1/00034* (2013.01); *H04N 1/00045* (2013.01)
(58) Field of Classification Search
CPC .......... H04N 1/00002–00092; H04N 1/00482; H04N 1/2338; H04N 1/603–605; G06K 15/027; G06K 15/1868; G03G 15/5062; G03G 15/55; G03G 2215/00569; B41J 29/393; B41J 2029/3935
See application file for complete search history.

(56) References Cited

U.S. PATENT DOCUMENTS

| | | | | |
|---|---|---|---|---|
| 12,001,735 B2 * | 6/2024 | Miyahara | .............. | G06F 3/1208 |
| 12,047,537 B2 * | 7/2024 | Muraishi | ........... | H04N 1/00037 |
| 12,081,708 B2 * | 9/2024 | Okada | ................ | H04N 1/00029 |
| 12,164,815 B2 * | 12/2024 | Murakami | ........... | G06F 3/1205 |

(Continued)

FOREIGN PATENT DOCUMENTS

| | | |
|---|---|---|
| JP | 2016180856 A | 10/2016 |
| JP | 2021176703 A | 11/2021 |

OTHER PUBLICATIONS

European Search Report & Search Opinion dated Apr. 12, 2024 for application No. EP 23 210 171 (Year: 2024).*
English Translation of JP 2021-176703 A (Year: 2021).*

*Primary Examiner* — Scott A Rogers
(74) *Attorney, Agent, or Firm* — Canon U.S.A., Inc. IP Division

(57) ABSTRACT
An inspection apparatus includes a controller configured to register image data upon receiving the image data, receive information about an arrangement location of the image data, wherein the arrangement location is obtained based on the image data and a print setting, register a reference image obtained by rearranging the registered image data based on the information about the arrangement location, and inspect a printed material on which the image data is printed, upon receiving a scanned image obtained by scanning the printed material, based on the scanned image and the reference image, wherein the arrangement location of the image data includes information indicating whether to perform the inspection.

15 Claims, 7 Drawing Sheets

(56)         References Cited

U.S. PATENT DOCUMENTS

| | | | |
|---|---|---|---|
| 2013/0223866 A1* | 8/2013 | Kazama | ................ G06F 3/1259 |
| | | | 399/82 |
| 2013/0301070 A1 | 11/2013 | Saisho | |
| 2018/0262639 A1 | 9/2018 | Anezaki | |
| 2019/0238685 A1 | 8/2019 | Tsukamoto | |
| 2020/0387099 A1 | 12/2020 | Tokuma et al. | |

* cited by examiner

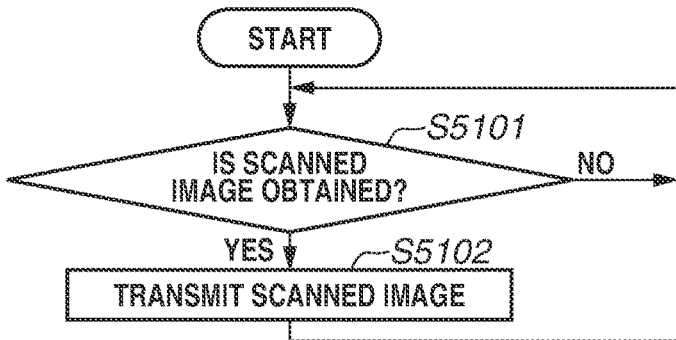

START

S5101

IS SCANNED IMAGE OBTAINED? — NO

YES ↓ S5102

TRANSMIT SCANNED IMAGE

FIG.5C

START

S5201

IS ANY ONE OF IMAGE DATA, SCANNED IMAGE, AND SHEET GENERATION ORDER DATA RECEIVED? — NO

YES ↓ S5202

STORE RECEIVED DATA

S5203

IS IMAGE DATA RECEIVED? — YES

NO ↓ S5204

IS SCANNED DATA RECEIVED? — YES

NO ↓

S5205

DOES SHEET TO BE SUBSEQUENTLY PROCESSED BASED ON SHEET GENERATION ORDER DATA CORRESPOND TO SCANNING TARGET? — NO

YES ↓ S5206

GENERATE INSPECTION REFERENCE DATA BASED ON IMAGE DATA AND SHEET GENERATION ORDER DATA

S5207

DOES SHEET TO BE SUBSEQUENTLY PROCESSED BASED ON SHEET GENERATION ORDER DATA CORRESPOND TO INSPECTION TARGET? — NO

YES ↓ S5208

PERFORM INSPECTION PROCESSING BASED ON INSPECTION REFERENCE DATA AND SCANNED IMAGE

↓ S5209

RECORD INSPECTION DETERMINATION RESULT

INSPECTION APPARATUS, CONTROL METHOD, INSPECTION SYSTEM, AND STORAGE MEDIUM FOR PERFORMING INSPECTION OF A PRINTED SHEET

BACKGROUND OF THE INVENTION

Field of the Invention

The present invention relates to an inspection apparatus, a control method for an inspection apparatus, an inspection system, a control method for an inspection system and a storage medium.

Description of the Related Art

There have been recently known inspection systems having a configuration in which an inspection apparatus inspects each sheet printed by a printing apparatus during conveyance of the sheet. In the inspection of a printed sheet, an image printed on an output material (printed sheet) in an executed print job is analyzed and the image is compared with a reference image registered in the inspection apparatus, thereby determining whether the printed sheet is normally printed. In an inspection system discussed in Japanese Patent Application Laid-Open No. 2016-180856, image data that is first input to an image forming unit is registered in an inspection apparatus. In the inspection system, an image scanned from a printed material is compared with the image data registered in the inspection apparatus to inspect the finished quality of the printed material.

SUMMARY OF THE INVENTION

In a printing apparatus, a sheet other than printed materials, such as a printed sheet on which a correction image is printed or a partition sheet, can be inserted between the printed materials. The insertion of such a sheet causes an issue in the inspection system discussed in Japanese Patent Application Laid-Open No. 2016-180856. If such a sheet is inserted between printed materials, there occurs a difference between the sequence of pieces of image data registered in the inspection apparatus and the sequence of scanned images, which creates an issue that the inspection apparatus is unable to accurately inspect the finished quality of the printed materials.

According to an aspect of the present invention, an inspection apparatus includes a controller configured to register image data upon receiving the image data, receive information about an arrangement location of the image data, wherein the arrangement location is obtained based on the image data and a print setting, register a reference image obtained by rearranging the registered image data based on the information about the arrangement location, and perform an inspection on a printed material on which the image data is printed, upon receiving a scanned image obtained by scanning the printed material, based on the scanned image and the reference image, wherein the arrangement location of the image data includes information indicating whether to perform the inspection.

Further features of the present invention will become apparent from the following description of embodiments with reference to the attached drawings.

BRIEF DESCRIPTION OF THE DRAWINGS

FIG. 3 is a sectional view illustrating a mechanism of an image processing apparatus.

FIG. 4 illustrates a data flow according to the first embodiment.

FIG. 5B is a flowchart illustrating an example of processing to be performed by an image scanning apparatus according to the first and second embodiments, and FIG. 5C is a flowchart illustrating an example of processing to be performed by an inspection apparatus according to the first and second embodiments.

DESCRIPTION OF THE EMBODIMENTS

Embodiments of the present invention will be described in detail with reference to the accompanying drawings. The following embodiments are not intended to limit the scope of the invention encompassed by the appended claims. Further, not all combinations of features described in the embodiments are essential to the solution of in the present invention. An external controller according to an embodiment of the present invention is also called an image processing controller, a digital front end (DFE), or a print server. An image processing apparatus according to an embodiment of the present invention is also called a multifunction peripheral (MFP).

The underlying technique for embodiments of the present invention will be described. In an inspection of a printed sheet in an inspection system, an inspection apparatus first scans an image on a conveyed printed sheet, and the scanned image is registered as a reference image. The inspection apparatus then analyzes an image on an output material (printed sheet) in an executed print job and compares the image with the reference image to thereby determine whether the printed sheet is normally printed. The inspection performed by the inspection apparatus makes it possible to detect, for example, stains generating in printing and a missing page.

Figure 1:
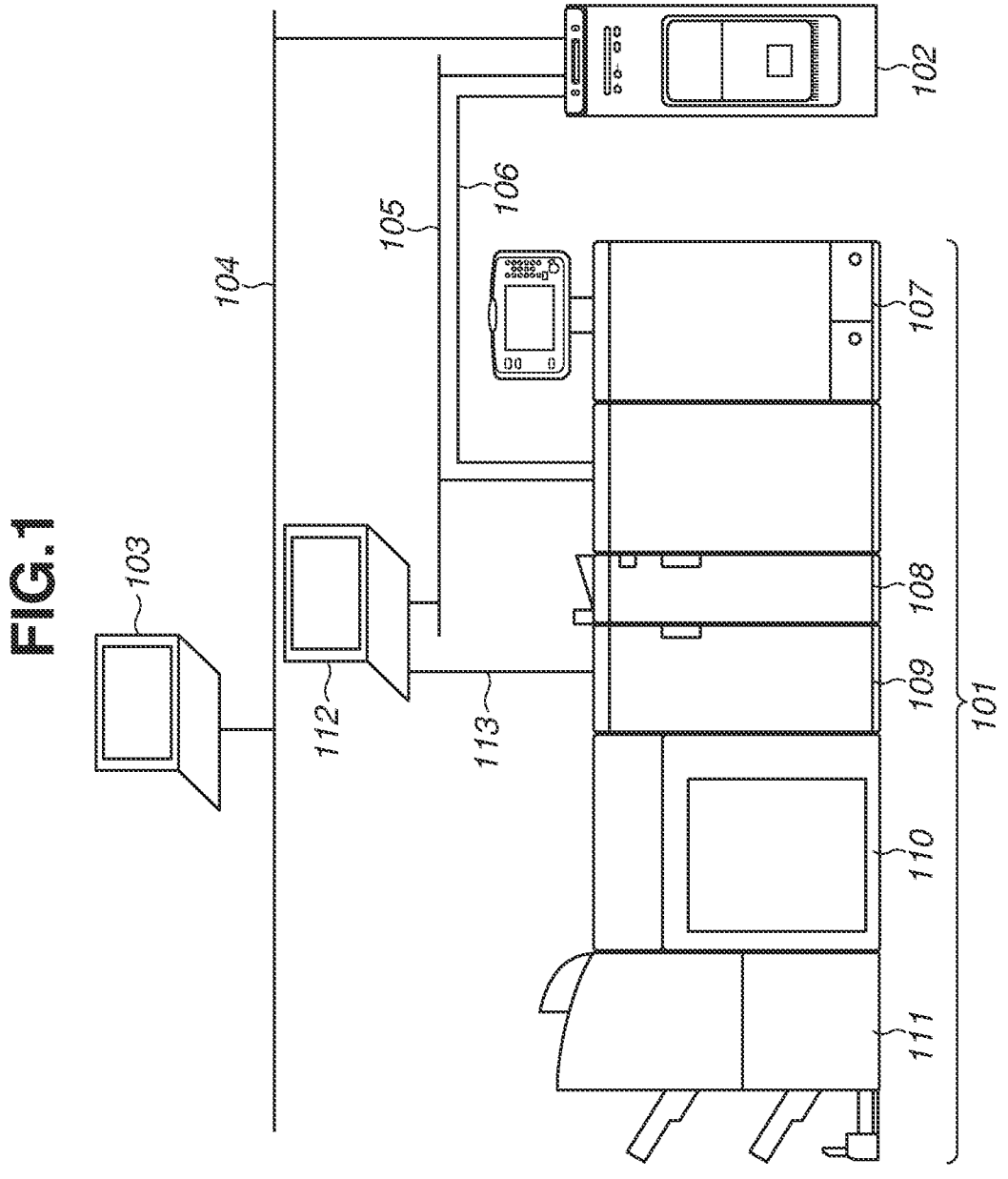
FIG. 1 is an overall view of a hardware configuration of a printing system according to a first embodiment.

FIG. 1 is an overall view of a hardware configuration of a printing system (image processing system) according to a first embodiment. The image processing system includes an image forming apparatus 101 and an external controller 102. The image forming apparatus 101 and the external controller 102 are connected with each other in a communicable manner via a local area network (LAN) 105 and a video cable 106. The external controller 102 is connected to a personal computer (PC) 103 in a communicable manner via a LAN 104. The PC 103 issues a print instruction to the external controller 102.

The image forming apparatus 101 and an inspection apparatus 112 are connected with each other in a communicable manner via the LAN 105 and a video cable 113.

A printer driver including a function of converting print data into a print description language that can be processed by the external controller 102 is installed on the PC 103. A user who executes printing can issue a print instruction through various applications via the printer driver. The printer driver transmits print data to the external controller 102 based on the print instruction from the user. Upon receiving the print instruction from the PC 103, the external controller 102 performs data analysis and rasterization processing on the image data, inputs the processed print data to the image forming apparatus 101, and issues a print instruction to the image forming apparatus 101. The external controller 102 inputs print data to the image forming apparatus 101 via the LAN 105, and inputs rasterized image data to the image forming apparatus 101 via the video cable 106.

Next, the image forming apparatus 101 will be described. The image forming apparatus 101 has a structure in which a plurality of apparatuses having different functions is connected and is configured to perform complicated print processing such as bookbinding.

A printing apparatus 107 forms an image using toner on a sheet conveyed from a sheet feed unit located in the lower part of the printing apparatus 107. While the present embodiment is described using a sheet by way of example, any print medium, such as a recording sheet, may be used instead of a sheet.

A configuration and operation principle of the printing apparatus 107 will be described below. A light beam, such as laser light, is modulated based on image data and is reflected by a rotary polygon mirror, such as a polygon mirror, and a photosensitive drum is irradiated with the reflected light as scanning light.

An electrophotographic latent image formed on the surface of the photosensitive drum by the laser light is developed with toner, and the toner image is transferred onto a sheet attached to the surface of a transfer drum. This series of image forming processes is sequentially performed using toner of yellow (Y), magenta (M), cyan (C), and black (K), thereby forming a full-color image on the sheet. The sheet on which the full-color image is formed on the transfer drum is conveyed to a fixing device. The fixing device includes a roller, a belt and the like, and also includes a built-in heat source, such as a halogen heater, in the roller. The fixing device melts the toner on the sheet onto which the toner image is transferred and fixes the toner to the sheet with heat and pressure. A sensing unit 108 is an apparatus for scanning a diagnostic chart as an image for correction and image diagnosis on the conveyed sheet. In the present embodiment, the sensing unit 108 is also referred to as an image diagnosis unit. The sensing unit 108 can feed a result of scanning back to the printing apparatus 107 and reflect a result of correction in printing processes to be performed in the printing apparatus 107 and can perform not only color correction but also diagnosis of a malfunctioning portion of the printing apparatus 107. Specifically, first, the printing apparatus 107 prints a predetermined diagnostic chart, and the sensing unit 108 scans the diagnostic chart. Next, the scanning result of the diagnostic chart is compared with a preliminarily held diagnostic chart image. Based on the comparison, it is possible to reflect the correction in printing processes to be performed in the printing apparatus 107 and to diagnose a malfunctioning portion in the printing apparatus 107. A notification about the result of diagnosis of the malfunctioning portion can be provided to the user.

An image scanning apparatus 109 generates scanned image data by scanning an image on a conveyed sheet (printed material) and transfers the scanned image data to the inspection apparatus 112 via the video cable 113.

A large-capacity stacker 110 is an apparatus on which a large number of sheets can be stacked. A finisher 111 is an apparatus that performs finishing processing to conveyed sheets. The finisher 111 is configured to perform finishing processing, such as stapling, punching, and saddle stitch binding, depending on a print setting, and to discharge the processed sheets onto a discharge tray.

The inspection apparatus 112 is an apparatus that compares image data received via the video cable 113 with preliminarily registered reference image data to thereby determine whether the image is normally printed. The printed materials that have been subjected to the determination process for determining whether the printed materials are normally printed are sorted into two types, for example, printed materials on which printing has been normally performed and printed materials in which an error has occurred, and are then discharged separately.

The printing system illustrated in FIG. 1 has a configuration in which the external controller 102 is connected to the image forming apparatus 101. However, the present invention is not limited to the configuration in which the external controller 102 is connected to the image forming apparatus 101.

Specifically, the printing system may have a configuration in which the image forming apparatus 101 is connected to the LAN 104 and the PC 103 transmits print data that can be processed by the image forming apparatus 101 to the image forming apparatus 101. In this case, the image forming apparatus 101 performs data analysis and rasterization processing and executes print processing.

In the present embodiment, the image forming apparatus 101 and the inspection apparatus 112 are also collectively referred to as an image processing apparatus.

Figure 2:
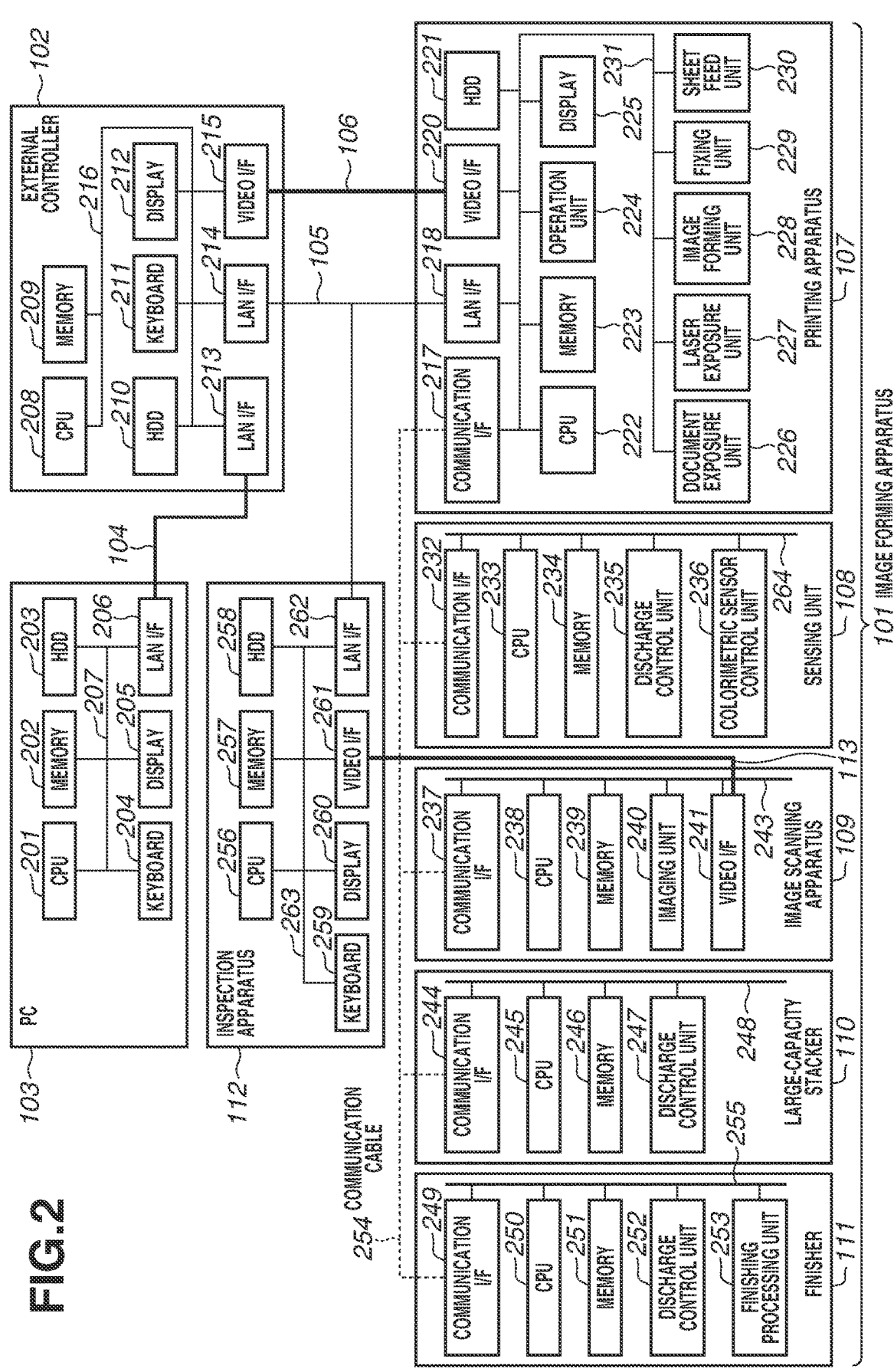
FIG. 2 is a block diagram illustrating a system configuration of the printing system.

FIG. 2 is a block diagram illustrating a system configuration of each of the image forming apparatus 101, the external controller 102, the PC 103, and the inspection apparatus 112.

A configuration example of the printing apparatus 107 of the image forming apparatus 101 will now be described. The printing apparatus 107 of the image forming apparatus 101 includes a communication interface (I/F) 217, a LAN I/F 218, a video I/F 220, a hard disk drive (HDD) 221, a central processing unit (CPU) 222, a memory 223, an operation unit 224, and a display 225. The printing apparatus 107 of the image forming apparatus 101 also includes a document exposure unit 226, a laser exposure unit 227, an image forming unit 228, a fixing unit 229, and a sheet feed unit 230. These components are connected with each other via a system bus 231.

The communication I/F 217 is connected to the sensing unit 108, the image scanning apparatus 109, the large-capacity stacker 110, and the finisher 111 via a communication cable 254 to perform communication for controlling the sensing unit 108, the image scanning apparatus 109, the large-capacity stacker 110, and the finisher 111.

The LAN I/F 218 is connected to the external controller 102 and the inspection apparatus 112 via the LAN 105 to communicate a control command, image data, and the like.

The video I/F 220 is connected to the external controller 102 via the video cable 106 to communicate rasterized image data and the like.

The HDD 221 is a storage device storing programs and data. The CPU 222 controls image processing and printing in a comprehensive manner based on programs and the like stored in the HDD 221. The memory 223 stores programs and image data to be used for the CPU 222 to perform various processing, and operates as a work area.

The operation unit 224 receives various settings and operation instructions input by the user. The display 225 displays setting information about the image forming apparatus 101, a processing status of a print job, and the like.

The document exposure unit 226 performs document scanning processing when a copy function or a scanning function is used. The document exposure unit 226 scans document data by capturing an image on a sheet placed by the user with a charge-coupled device (CCD) camera while illuminating the sheet with an exposure lamp.

The laser exposure unit 227 is an apparatus that performs primary charging and laser exposure to irradiate the photosensitive drum with laser light to transfer the toner image. The laser exposure unit 227 first primarily charges the surface of the photosensitive drum uniformly to a negative potential. Next, the laser exposure unit 227 irradiates the surface of the photosensitive drum with laser light from a laser driver, while adjusting the reflection angle of the laser light with the polygon mirror. Negative charges on the irradiated portion are neutralized, so that an electrostatic latent image is formed.

The image forming unit 228 is an apparatus for transferring toner onto a sheet, and includes a developing unit, a transfer unit, and a toner replenishment unit. The image forming unit 228 transfers toner on the surface of the photosensitive drum onto a sheet.

The developing unit allows negatively charged toner from a developing cylinder to adhere to the electrostatic latent image on the surface of the photosensitive drum, thereby visualizing the image. The transfer unit performs a primary transfer to transfer toner on the surface of the photosensitive drum onto the transfer belt by applying a positive potential to a primary transfer roller, and performs a secondary transfer to transfer toner on the transfer belt onto a sheet by applying a positive potential to a second transfer external roller.

The fixing unit 229 is an apparatus for melting and fixing toner onto a sheet with heat and pressure, and includes a heating heater, a fixing belt, and a pressure belt.

The sheet feed unit 230 is an apparatus for feeding sheets. The sheet feed unit 230 controls a sheet feed operation and a sheet conveyance operation using rollers and various sensors.

Next, a configuration example of the sensing unit 108 of the image forming apparatus 101 will be described. The sensing unit 108 of the image forming apparatus 101 includes a communication I/F 232, a CPU 233, a memory 234, a discharge control unit 235, and a colorimetric sensor control unit 236. These components are connected with each other via a system bus 264. The communication I/F 232 is connected to the printing apparatus 107 via the communication cable 254 to perform communication for control. The CPU 233 performs various control processing for scanning a correction image on a sheet and discharging the sheet to the outside of the printing apparatus 107, as needed, according to control programs stored in the memory 234. The memory 234 is a storage device storing control programs. The colorimetric sensor control unit 236 scans the correction image on the sheet based on an instruction from the CPU 233. The discharge control unit 235 performs control processing for conveying the sheet conveyed from the printing apparatus 107 and discharging the sheet to the outside of the printing apparatus 107, as needed, while controlling rollers and sensors based on an instruction from the CPU 233.

Next, a configuration example of the image scanning apparatus 109 of the image forming apparatus 101 will be described. The image scanning apparatus 109 of the image forming apparatus 101 includes a communication I/F 237, a CPU 238, a memory 239, an imaging unit 240, and a video I/F 241. These components are connected with each other via a system bus 243. The communication I/F 237 is connected to the printing apparatus 107 via the communication cable 254 to perform communication for control. The imaging unit 240 captures an image of the conveyed sheet based on an instruction from the CPU 238, and stores scanned image data obtained by image capturing in the memory 239. In the present embodiment, an image scanned by the image scanning apparatus 109 is referred to as a scanned image. However, the image need not necessarily be generated by scanning. The CPU 238 transfers image data to the inspection apparatus 112 via the video I/F 241 and the video cable 113.

Next, a configuration example of the large-capacity stacker 110 of the image forming apparatus 101 will be described. The large-capacity stacker 110 of the image forming apparatus 101 includes a communication I/F 244, a CPU 245, a memory 246, and a discharge control unit 247. These components are connected with each other via a system bus 248. The communication I/F 244 is connected to the printing apparatus 107 via the communication cable 254 to perform communication for control. The CPU 245 performs various control processing for discharging sheets based on control programs stored in the memory 246. The memory 246 is a storage device storing control programs. The discharge control unit 247 performs control processing for conveying the conveyed sheet to a stack tray, an escape tray, or the subsequent-stage finisher 111 based on an instruction from the CPU 245.

Next, a configuration example of the finisher 111 of the image forming apparatus 101 will be described. The finisher 111 of the image forming apparatus 101 includes a communication I/F 249, a CPU 250, a memory 251, a discharge control unit 252, and a finishing processing unit 253. These components are connected with each other via a system bus 255. The communication I/F 249 is connected to the printing apparatus 107 via the communication cable 254 to perform communication for control. The CPU 250 performs various control processing for finishing processing and discharge processing based on control programs stored in the memory 251. The memory 251 is a storage device storing control programs. The discharge control unit 252 controls sheet conveyance and discharge processing based on an instruction from the CPU 250. The finishing processing unit 253 performs finishing processing, such as stapling, punching, and saddle stitch binding, based on an instruction from the CPU 250.

Next, a configuration example of the external controller 102 will be described. The external controller 102 includes a CPU 208, a memory 209, an HDD 210, a keyboard 211, a display 212, a LAN I/F 213, a LAN I/F 214, and a video I/F 215. These components are connected with each other via a system bus 216. The CPU 208 executes processing, such as reception of print data from the PC 103, raster image processor (RIP) processing, and transmission of print data to the image forming apparatus 101, in a comprehensive manner based on programs and data stored in the HDD 210.

The memory 209 stores programs and data to be used for the CPU 208 to perform various processing, and operates as a work area. The HDD 210 stores programs and data to be used for operation such as print processing. The keyboard 211 is an apparatus for inputting operation instructions for the external controller 102. The display 212 displays information about, for example, an execution application of the external controller 102 using still images and video signals of moving images. The LAN I/F 213 is connected to the PC 103 via the LAN 104 to communicate a print instruction and the like. The LAN I/F 214 is connected to the image forming apparatus 101 via the LAN 105 to communicate print data and the like as print instructions. The video I/F 215 is connected to the image forming apparatus 101 via the video cable 106 to communicate rasterized image data and the like.

Next, a configuration example of the PC 103 will be described. The PC 103 includes a CPU 201, a memory 202, an HDD 203, a keyboard 204, a display 205, and a LAN I/F 206. These components are connected with each other via a system bus 207. The CPU 201 creates print data and executes a print instruction based on a document processing program and the like stored in the HDD 203. The CPU 201 controls devices connected to the system bus 207 in a comprehensive manner. The memory 202 stores programs and data for the CPU 201 to perform various processing, and operates as a work area. The HDD 203 stores programs and data for performing operation such as print processing. The keyboard 204 is an apparatus for inputting operation instructions for the PC 103. The display 205 displays information about, for example, an execution application for the PC 103 using still images and video signals of moving images. The LAN I/F 206 is connected to the LAN 104 to communicate a print instruction and the like.

Next, a configuration of the inspection apparatus 112 will be described. The inspection apparatus 112 includes a CPU 256, a memory 257, an HDD 258, a keyboard 259, a display 260, a video I/F 261, and a LAN I/F 262. These components are connected with each other via a system bus 263. The CPU 256 executes inspection processing on the printed materials based on an inspection program and the like stored in the HDD 258. The CPU 256 controls the devices connected to the system bus 263 in a comprehensive manner. The memory 257 stores programs and data to be used for the CPU 256 to perform various processing, and operates as a work area. The HDD 258 stores programs and reference image data to be used for operation, such as inspection processing, and information on an inspection determination result. The keyboard 259 is an apparatus for inputting an operation instruction for the inspection apparatus 112. The display 260 displays an inspection determination result, an inspection processing setting screen, and the like. The video I/F 261 is connected to the video cable 113, and receives scanned image data captured by the image scanning apparatus 109. The LAN I/F 262 is connected to the LAN 105 and, for example, receives reference image data. The CPU 256 compares the image captured by the imaging unit 240 with the reference image stored in the HDD 258, and determines whether the image is normally printed. Specifically, the CPU 256 extracts feature points from the reference image and the scanned image captured by the imaging unit 240, and aligns the reference image and the scanned image based on the extracted feature points. If the difference between a pixel value (luminance value) of an inspection target pixel in the scanned image after the images are aligned and a pixel value (luminance value) of a comparison target pixel in a correct answer image is less than or equal to a threshold, the CPU 256 determines the inspection target pixel as passed. Different thresholds are set for respective different inspection levels. This inspection processing is performed for each reference image corresponding to each scanned image.

If the inspection processing on all pixels is completed, it is determined whether the total number of pixels determined as failed is less than or equal to a pass threshold, to thereby determine whether the scanned image is normal. If the total number of pixels determined as failed is less than or equal to the pass threshold, the CPU 238 determines that the scanned image is normal. If the total number of pixels determined as failed is more than the pass threshold, the CPU 238 determines that the scanned image is not normal.

As described above, the external controller 102 and the image forming apparatus 101 are connected via the LAN

105 and the video cable 106. However, any connection configuration can be employed as long as the external controller 102 and the image forming apparatus 101 can communicate data to be used for printing. For example, the external controller 102 and the image forming apparatus 101 may be connected only via the video cable 106. The memory 202, the memory 209, the memory 223, the memory 234, the memory 239, the memory 246, and the memory 251 may be any storage devices as long as they can store data and programs. For example, these memories may be replaced by a volatile random access memory (RAM), a nonvolatile read-only memory (ROM), a built-in HDD, an external HDD, a universal serial bus (USB) memory, or the like.

Figure 3:
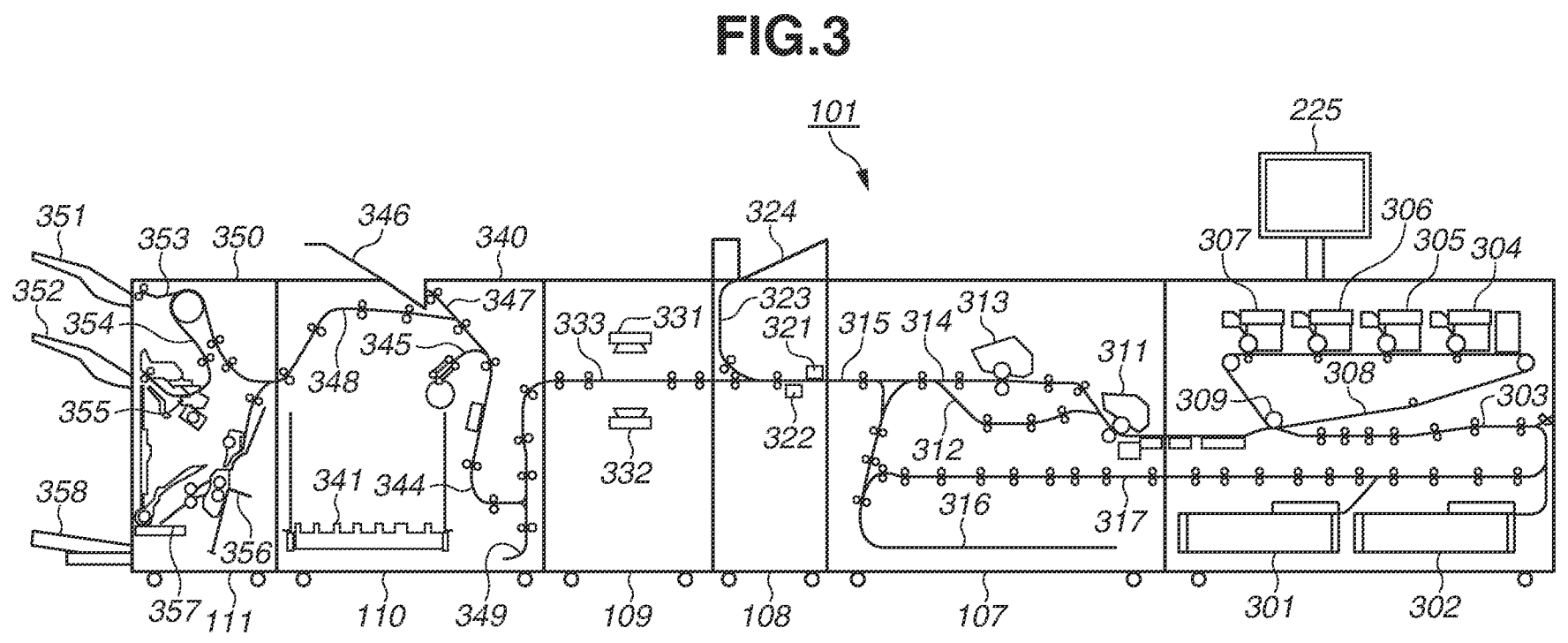

FIG. 3 is a sectional view illustrating a mechanism of the image forming apparatus 101 illustrated in FIG. 1. The printing apparatus 107 forms an image to be printed on a sheet. A sheet feed deck 301 and a sheet feed deck 302 are configured to accommodate various types of sheets. Information (sheet size, sheet type) about sheets stored in the sheet feed deck 301 and the sheet feed deck 302 can be set from the operation unit 224 of the printing apparatus 107. In the sheet feed deck 301 and the sheet feed deck 302, only one uppermost sheet is separated from the accommodated sheets and conveyed to a sheet conveyance path 303. Developing stations 304 to 307 form toner images using colored toner of Y, M, C, and K, respectively, to form a color image. The formed toner images are primarily transferred to the surface of an intermediate transfer belt 308, and the intermediate transfer belt 308 rotates clockwise in FIG. 3, so that the toner images are transferred onto the sheet conveyed from the sheet conveyance path 303 at a secondary transfer position 309. The display 225 displays information about a printing status and settings of the image forming apparatus 101. A fixing unit 311 fixes the toner images onto the sheet. The fixing unit 311 includes a pressure roller and a heating roller. While the sheet passes between the pressure roller and the heating roller, the toner is melted and pressed to thereby fix the toner images onto the sheet. The sheet that has passed through the fixing unit 311 passes through a sheet conveyance path 312 and is then conveyed to a sheet conveyance path 315. If there is a need to further melt and press the toner for fixation depending on the type of the sheet, the sheet passes through the fixing unit 311 and is then conveyed to a second fixing unit 313 through an upper sheet conveyance path. In the second fixing unit 313, an additional melting and pressing process is performed on the sheet. After that, the sheet passes through a sheet conveyance path 314 and is then conveyed to the sheet conveyance path 315. If two-sided printing is set as an image formation mode, the sheet is conveyed to a sheet reverse path 316 and is reversed by the sheet reverse path 316. Then, the sheet is conveyed to a two-sided conveyance path 317, and an image is transferred onto a second surface of the sheet at the secondary transfer position 309. The sensing unit 108 scans the correction image on the sheet, and discharges the sheet to the outside of the printing apparatus 107, as needed. The sensing unit 108 includes colorimetric sensors 321 and 322. The colorimetric sensors 321 and 322 scan the correction image on the sheet conveyed from the sheet conveyance path 315. Then, the sheet passes through a sheet conveyance path 323 and is discharge onto a discharge tray 324 that is located outside of the printing apparatus 107. As a result, only the sheet on which the correction image is printed in the sheet group conveyed from the printing apparatus 107 can be discharged to the outside of the printing apparatus 107. Consequently, it is possible to prevent the sheet on which the correction image is printed from being included in an original merged document. Alternatively, the sheet on which the correction image is printed may be conveyed to the subsequent-stage apparatus and may be discharged onto an escape tray 346 to be described below, thereby making it possible to prevent the sheet on which the correction image is printed from being included in the original merged document.

The sheet that has passed through the sensing unit 108 is conveyed to the image scanning apparatus 109. Cameras 331 and 332 are opposed to each other in the image scanning apparatus 109. The camera 331 is a camera for scanning the upper surface of a sheet, and the camera 332 is a camera for scanning the lower surface of a sheet. The image scanning apparatus 109 scans sheet images using the cameras 331 and 332 at a timing when the sheet conveyed through a sheet conveyance path 333 reaches a predetermined position, and transfers scanned image data to the inspection apparatus 112. The large-capacity stacker 110 is a stacker on which a large number of sheets can be stacked. The large-capacity stacker 110 includes a stack tray 341 as a tray on which sheets that are determined to be normal sheets (printed materials) by the inspection apparatus 112 are stacked. The sheet that has passed through the image scanning apparatus 109 passes through a sheet conveyance path 344 and is delivered into the large-capacity stacker 110. The sheet that has passed through the sheet conveyance path 344 and is tacked on the stack tray 341 via a sheet conveyance path 345. A stacker 340 includes the escape tray 346 as a discharge tray. The escape tray 346 is a discharge tray used to discharge sheets determined to be sheets (printed materials) in which an error has occurred by the inspection apparatus 112. In the case of outputting the sheet onto the escape tray 346, the sheet is conveyed from the sheet conveyance path 344 onto the escape tray 346 via a sheet conveyance path 347. In the case of conveying the sheet to a post processing apparatus at the subsequent stage of the large-capacity stacker 110, the sheet is conveyed via a sheet conveyance path 348. A reverse portion 349 reverses the sheet. The reverse portion 349 is used to stack the sheet on the stack tray 341. In the case of stacking the sheet on the stack tray 341, the sheet is reversed once by the reverse portion 349 such that the orientation of the input sheet matches the orientation of the sheet to be output. In the case of conveying the sheet onto the escape tray 346 or the subsequent-stage post processing apparatus, the sheet is directly discharged without being flipped during stacking, and thus the reverse operation is not performed by the reverse portion 349. The finisher 111 is an apparatus that performs finishing processing on the conveyed sheet depending on the function designated by the user. Specifically, the finisher 111 has finishing functions such as stapling (single position, double positions), punching (two holes, three holes), and saddle stitch binding. The finisher 111 includes a discharge tray 351 and a discharge tray 352. The sheet is output onto the discharge tray 351 via a sheet conveyance path 353. However, finishing processing such as stapling cannot be performed in the sheet conveyance path 353. In the case of performing finishing processing such as stapling, the finishing function designated by the user is executed on the sheet in a processing portion 355 after the sheet passes through a sheet conveyance path 354, and then the sheet is output onto the discharge tray 352. The discharge trays 351 and 352 are configured to ascend or descend. The discharge tray 351 can also be operated to descend so that the sheets on which finishing processing has been performed in the processing portion 355 can be stacked on the discharge tray 351. If saddle stitch binding is designated, a saddle stitching processing portion 356 performs stapling processing at the center of each sheet, folds the sheets in half, and outputs the sheets onto to a saddle stitch binding tray 358 via a sheet conveyance path 357.

The saddle stitch binding tray 358 is configured like a belt conveyor. A sheet bundle subjected to saddle stitch binding processing and stacked on the saddle stitch binding tray 358 is conveyed leftward in FIG. 3.

Figure 4:
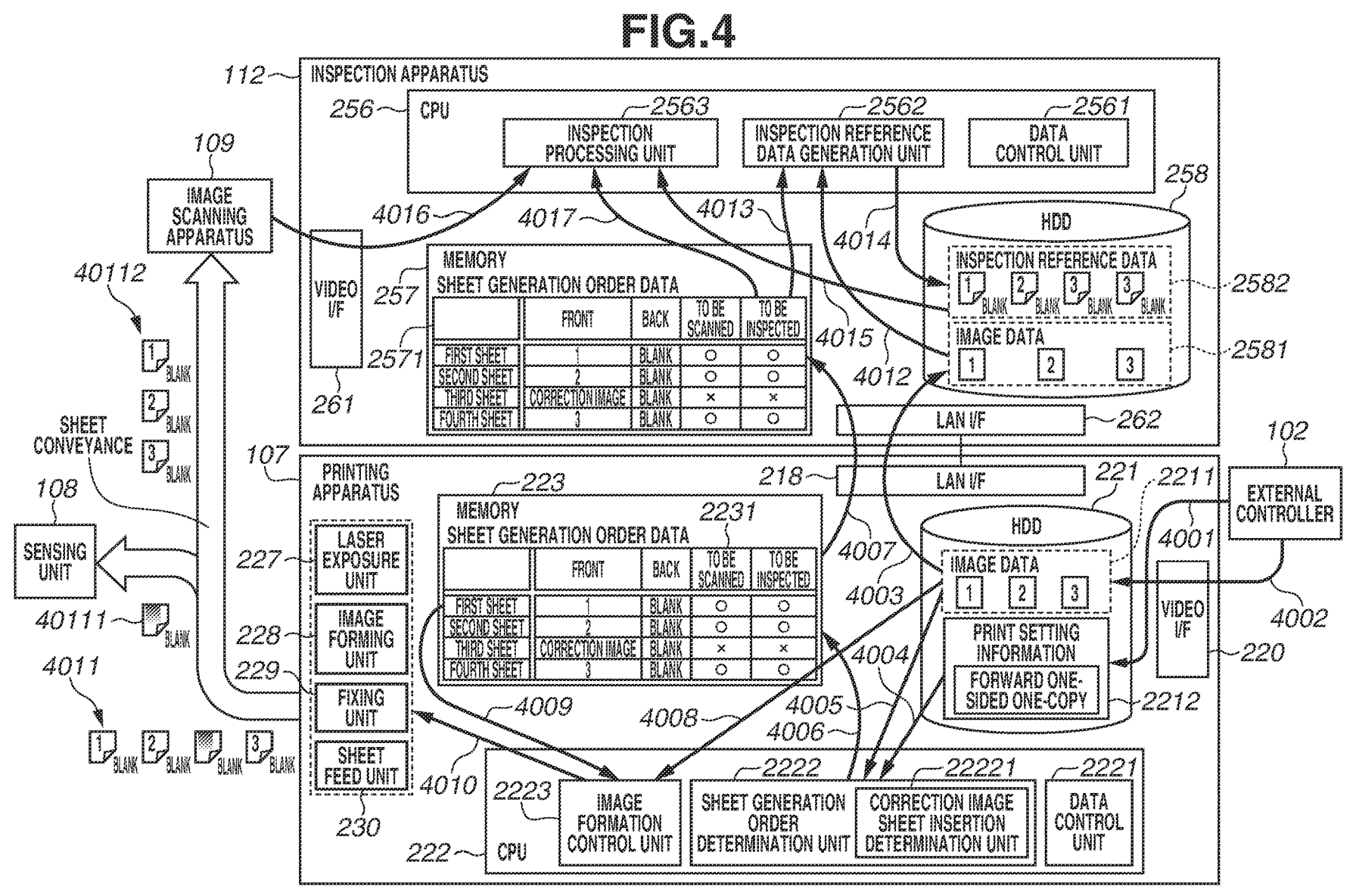

FIG. 4 illustrates a data flow in each of the printing apparatus 107 and the inspection apparatus 112 according to the present embodiment.

The printing apparatus 107 receives print setting information 2212 from the external controller 102 via the LAN I/F 218 and receives image data 2211 via the video I/F 220. The image data 2211 received in this case is image data on which RIP processing is performed by the external controller 102. The image data 2211 and the print setting information 2212 are stored in the HDD 221. As indicated by arrows 4001 and 4002 in FIG. 4, the image data 2211 and the print setting information 2212 are held in the HDD 221, but instead may be stored in the memory 223. This reception and storage processing is performed by a data control unit 2221 to be executed by the CPU 222. The print setting information 2212 and the image data 2211 may be both received via the LAN I/F 218.

As indicated by an arrow 4003, the data control unit 2221 transmits the image data 2211 to the inspection apparatus 112 via the LAN I/F 218.

A sheet generation order determination unit 2222 to be executed by the CPU 222 generates sheet generation order data 2231 based on the image data 2211 and the print setting information 2212 in the HDD 221, and stores the sheet generation order data 2231 in the memory 223 as indicated by arrows 4004, 4005, and 4006. In FIG. 4, the sheet generation order data 2231 is stored in the memory 223, but instead may be stored in the HDD 221.

The sheet generation order determination unit 2222 includes a correction image sheet insertion determination unit 22221 that determines whether to insert a sheet on which a correction image is printed (hereinafter referred to as a correction image sheet) at predetermined intervals.

The sheet generation order determined by the sheet generation order determination unit 2222 indicates the order in which sheets are conveyed through the sheet conveyance path 315 of the printing apparatus 107. The image scanning apparatus 109 sequentially scans the sheets conveyed through the sheet conveyance path 333 in the determined order of sheets. In this case, however, the sheet discharged onto the discharge tray 324 of the sensing unit 108 is excluded.

In FIG. 4, the image data 2211 indicates three pages of documents, and the print setting information 2212 indicates setting information "forward one-sided one-copy".

Assume that the correction image sheet insertion determination unit 22221 determines that the correction image sheet is inserted at a position corresponding to a third sheet. In this case, a setting about whether to insert the correction image is preliminarily made. For example, the correction image sheet insertion determination unit 22221 determines to insert the correction image every 500 sheets in a user mode set as an operation of the printing apparatus 107. In the print setting made for each job, a setting for enabling or disabling a correction image insertion function may be made. The correction image sheet insertion determination unit 22221 determines whether to insert the correction image sheet based on the setting in the user mode and the print setting made for each job.

As a result, the sheet generation order determination unit 2222 determines the sheet generation order as follows:

First sheet (front: first page of image data 2211, back: blank);

Second sheet (front: second page of image data 2211, back: blank);

Third sheet (front: correction image, back: blank); and

Fourth sheet (front: third page of image data 2211, back: blank). In this case, the third sheet is the sheet to be inserted on which no image data is printed.

Further, the sheet generation order determination unit 2222 determines each sheet to be scanned and to be inspected.

The item "to be scanned" in FIG. 4 indicates whether an image on each sheet conveyed to the image scanning apparatus 109 is to be scanned by the cameras 331 and 332. The symbol "o" represents a sheet to be scanned, and the symbol "x" represents a sheet not to be scanned.

The item "to be inspected" in FIG. 4 indicates whether the sheet to be scanned is to be inspected based on a comparison with inspection reference data 2582. The symbol "o" represents a sheet to be inspected, and the symbol "x" represents a sheet not to be inspected.

The print setting information includes at least a print setting for executing printing in a sequence different from the sequence of image data. Examples of the print setting information may include designation of a printing order, designation of a surface to be printed, such as double-sided or one-sided, and designation of the number of copies.

The data control unit 2221 transmits the sheet generation order data 2231 to the inspection apparatus 112 via the LAN I/F 218 as indicated by an arrow 4007 in FIG. 4.

An image formation control unit 2223 to be executed by the CPU 222 further determines a printing order based on the image data 2211 in the HDD 221 and the sheet generation order data 2231 in the memory 223. Further, the CPU 222 controls the laser exposure unit 227, the image forming unit 228, the fixing unit 229, and the sheet feed unit 230 to perform an image formation process as indicated by 4008, 4009, and 4010.

The image formation to be performed by controlling the laser exposure unit 227, the image forming unit 228, the fixing unit 229, and the sheet feed unit 230 can be executed only on one page at a time. To increase the productivity by decreasing the interval between sheets on the conveyance path, a double-sided circulation control for feeding a plurality of sheets at a time and then performing sheet feeding and re-feeding alternately is carried out.

If two sheets are fed at a time, the printing order is set as follows:

First printing order (first sheet: front);

Second printing order (second sheet: front);

Third printing order (first sheet: back);

Fourth printing order (third sheet: front);

Fifth printing order (second sheet: back);

Sixth printing order (fourth sheet: front);

Seventh printing order (third sheet: back); and

Eighth printing order (fourth sheet: back).

When printing is executed in the above-described printing order, on the printed materials as the printed sheets, printing is executed according to the arrangement locations on the sheets of the image data designated by the sheet generation order data.

The sheets (4011) on which images are formed by the printing apparatus 107 are conveyed to the subsequent-stage apparatus via the sheet conveyance path 315.

A correction image sheet 40111 in the sheet group 4011 conveyed from the sheet conveyance path 315 passes through the sheet conveyance path 323 and is discharged onto the discharge tray 324.

A remaining sheet group 40112 is conveyed to the image scanning apparatus 109, and the image scanning apparatus 109 scans the images on the sheets using the cameras 331 and 332. The scanned image data is transferred to the inspection apparatus 112.

Meanwhile, the inspection apparatus 112 receives the image data 2211 and the sheet generation order data 2231 from the printing apparatus 107 via the LAN I/F 262. A data control unit 2561 to be executed by the CPU 256 stores the image data 2211 in the HDD 258 and stores the sheet generation order data 2231 in the memory 257. In FIG. 4, the image data 2211 is stored in the HDD 258 and the sheet generation order data 2231 is stored in the memory 257 as described above, but instead the image data 2211 and the sheet generation order data 2231 may be both stored in either one of the HDD 258 and the memory 257, or may be stored in the memory 257 and the HDD 258, respectively. The image data 2211 stored in the inspection apparatus 112 is hereinafter referred to as image data 2581, and the sheet generation order data 2231 stored in the inspection apparatus 112 is hereinafter referred to as sheet generation order data 2571.

An inspection reference data generation unit 2562 to be executed by the CPU 256 generates the inspection reference data 2582 based on the image data 2581 in the HDD 258 and the sheet generation order data 2571 in the memory 257, and stores the generated inspection reference data 2582 in the HDD 258 as indicated by arrows 4012, 4013, and 4014.

The inspection reference data generation unit 2562 generates the inspection reference data 2582 only for the sheets to be scanned as indicated by "o" in the sheet generation order data 2571. Specifically, no sheet generation order data is generated for the third sheet (front: correction image, back: blank). The sheet generation order data 2571 is generated for only the remaining sheets as follows:

First sheet (front: first page of image data 2211, back: blank);

Second sheet (front: second page of image data 2211, back: blank); and

Fourth sheet (front: third page of image data 2211, back: blank).

Next, an inspection processing unit 2563 to be executed by the CPU 256 performs an inspection by comparing the inspection reference data 2582 in the HDD 258, the sheet generation order data 2571 in the memory 257, and the scanned image from the image scanning apparatus 109 as indicated by 4015, 4016, and 4017.

The inspection processing unit 2563 performs the inspection by comparing only the sheets to be scanned in the sheet generation order data 2571.

In the present embodiment, after the inspection is finished, the image data 2581 and the inspection reference data 2582 in the inspection apparatus 112 are deleted from the HDD 258. The image data 2211 and the print setting information 2212 in the printing apparatus 107 are also deleted.

However, the present embodiment is not limited to this example. Depending on the setting, all or a part of the data may be retained.

Instead of deleting the data at once after the inspection processing on all sheets is finished, the data may be sequentially deleted.

Figure 5A:
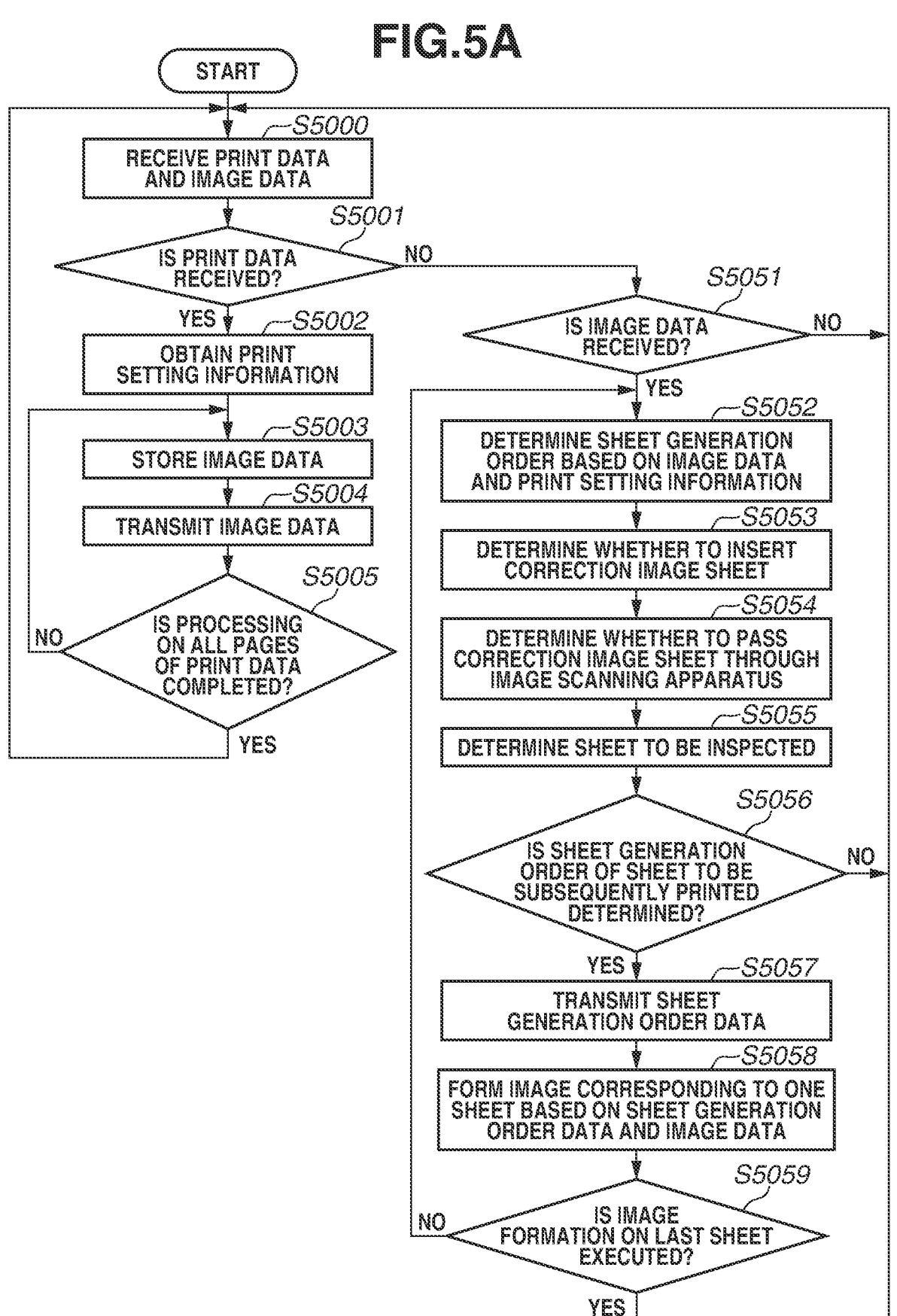
FIG. 5A is a flowchart illustrating an example of processing to be performed by a printing apparatus according to first and second embodiments.

FIG. 5A is a flowchart illustrating operation to be performed by the printing apparatus 107 according to the present embodiment. FIG. 5B is a flowchart illustrating operation to be performed by the image scanning apparatus 109 according to the present embodiment. FIG. 5C is a flowchart illustrating operation to be performed by the inspection apparatus 112 according to the present embodiment. Steps S5000 to S5059 in the flowchart is implemented by the CPU 222 in the printing apparatus 107 when the CPU 222 reads out and executes programs stored in the HDD 221. Steps S5101 and S5102 in the flowchart are implemented by the CPU 238 in the image scanning apparatus 109 when the CPU 238 reads out and executes programs stored in the memory 239. Steps S5201 to S5209 in the flowchart are implemented by the CPU 256 in the inspection apparatus 112 when the CPU 256 reads out and executes programs stored in the HDD 258.

In the registration of the reference image according to the present embodiment, rasterized image data is registered.

While the present embodiment is described using an example where rasterized image data is received from the external controller 102 via the video cable 106, the present embodiment is not limited to this example. For example, the image forming apparatus 101 may receive a print job (e.g., including page-description language (PDL) data) from the PC 103, and the image forming apparatus 101 may rasterize the print job.

Processing to be executed by the CPU 222 in the printing apparatus 107 will be described with reference to FIG. 5A.

Steps S5001 to S5005 and steps S5051 to S5059 are carried out in parallel on a multi-task operating system (OS) by the CPU 222 in the printing apparatus 107.

In step S5000, the CPU 222 of the printing apparatus 107 receives print data and image data from the external controller 102.

In step S5001, the data control unit 2221 to be executed by the CPU 222 of the printing apparatus 107 determines whether print data is received from the external controller 102. If print data is received (YES in step S5001), the processing proceeds to step S5002. If data other than print data is received (NO in step S5001), the processing proceeds to step S5051.

In step S5002, the data control unit 2221 to be executed by the CPU 222 obtains print setting information and information about the printing apparatus 107, and stores the obtained information in the HDD 221. This information corresponds to the print setting information 2212 illustrated in FIG. 4.

In step S5003, the data control unit 2221 to be executed by the CPU 222 stores the image data received via the video I/F 220 in the HDD 221.

In step S5004, the data control unit 2221 to be executed by the CPU 222 transmits image data to the inspection apparatus 112 via the LAN I/F 218.

In step S5005, the data control unit 2221 to be executed by the CPU 222 determines whether processing on all pages of the print data is completed. If the processing is completed (YES in step S5005), the processing returns to step S5000. If the processing is not completed (NO in step S5005), the processing returns to step S5003.

In step S5051, it is determined whether image data is received. If image data is received (YES in step S5051), the sheet generation order determination unit 2222 to be executed by the CPU 222 adds the image data to the image data 2211 in the HDD 221. After the addition, the processing proceeds to step S5052. If image data is not received (NO in step S5051), the processing returns to step S5000.

In step S5052, the sheet generation order determination unit 2222 to be executed by the CPU 222 determines the sheet generation order based on the image data 2211 and the print setting information 2212 in the HDD 221. The determined sheet generation order data 2231 is held in the HDD 221, and then the processing proceeds to step S5053.

In step S5052, however, it is not always possible to determine the sheet generation order of sheets to be subsequently printed.

For example, the print setting information 2212 illustrated in FIG. 4 indicates setting information "forward one-sided one-copy". However, if a print setting is made based on setting information "forward two-sided one-copy", the sheet generation order cannot be determined unless image data corresponding to two pages, i.e., the front page and the back page of a sheet, is received. Further, in the setting of "reverse order", in which sheets are printed in a reverse order, the sheet generation order cannot be determined unless all image data is received. The print setting information illustrated in FIG. 4 indicates an example where 1-in-1 printing is performed such that one piece of image data is printed on one side of a sheet, and the printing order and two-sided or one-sided printing are set in the print setting. However, the print setting information is not limited to this example. For example, a page layout such as 2-in-1 or 4-in-1 printing in which a plurality of pieces of image data is printed on one side of a sheet may be set in the print setting.

In step S5053, the correction image sheet insertion determination unit 22221 in the sheet generation order determination unit 2222 to be executed by the CPU 222 determines whether to insert the correction image sheet and reflects the determination result in the sheet generation order data 2231, and then the processing proceeds to step S5054.

In step S5054, it is determined whether the correction image sheet generated in step S5053 passes through the image scanning apparatus 109. If the correction image sheet passes through the image scanning apparatus 109, information indicating "o" is added to the item "to be scanned" in the sheet generation order data 2231. If the correction image sheet is discharged to the outside of the printing apparatus 107 at the upstream side of the image scanning apparatus 109 without passing through the image scanning apparatus 109, information indicating "x" is added to the sheet generation order data 2231, and then the processing proceeds to step S5055.

In step S5055, it is determined whether the sheets in the sheet generation order data 2231 which have been processed in steps S5052, S5053, and S5054 are to be inspected, after being scanned by the image scanning apparatus 109. If a sheet is to be inspected, information indicating "o" is added to the sheet in the item "to be inspected" of the sheet generation order data 2231. If a sheet is not to be inspected, information indicating "x" is added to the sheet generation order data 2231, and then the processing proceeds to step S5056.

In step S5056, the sheet generation order determination unit 2222 to be executed by the CPU 222 determines whether the sheet generation order of a sheet to be subsequently printed is determined. If the sheet generation order is determined (YES in step S5056), the processing proceeds to step S5057. If the sheet generation order is not determined (NO in step S5056), the processing returns to step S5000.

In step S5057, the sheet generation order determination unit 2222 to be executed by the CPU 222 transmits the sheet generation order data 2231 generated in steps S5052 to S5055 to the inspection apparatus 112 via the LAN I/F 218.

In step S5058, the image formation control unit 2223 to be executed by the CPU 222 forms an image on each sheet based on the image data 2211 in the HDD 221 and the sheet generation order data 2231 in the memory 223. The image formation is executed by the image formation control unit 2223 to be executed by the CPU 222 when the image formation control unit 2223 controls the laser exposure unit 227, image forming unit 228, the fixing unit 229, and the sheet feed unit 230.

In step S5059, the image formation control unit 2223 to be executed by the CPU 222 determines whether the image formation on the last sheet is executed in step S5058. In the determination as to whether the image formation on the last sheet is executed, it is determined whether the end of the sheet generation order data is reached. If the image formation on the last sheet is executed (YES in step S5059), the processing returns to step S5000. If the image formation on the last sheet is not executed (NO in step S5059), the processing returns to step S5052. In step S5052, the image formation on the subsequent sheet is executed.

It is assumed that the processing returns to step S5052 to execute the image formation on the subsequent sheet, even in a case where new image data is not added as in a case where the setting of two copies is designated.

Next, processing to be performed by the CPU 238 in the image scanning apparatus 109 will be described with reference to FIG. 5B.

In step S5101, the CPU 238 of the image scanning apparatus 109 determines whether a scanned image is obtained. If the scanned image is obtained (YES in step S5101), the processing proceeds to step S5102. If the scanned image is not obtained (NO in step S5101), the processing returns to step S5101.

In step S5102, the CPU 238 transmits the scanned image obtained in step S5101 to the inspection apparatus 112 via the video cable 113, and then the processing returns to step S5101.

Next, processing to be performed by the CPU 256 in the inspection apparatus 112 will be described with reference to FIG. 5C.

In step S5201, the CPU 256 of the inspection apparatus 112 determines whether any one of image data, a scanned image, and sheet generation order data is received. If any one of the image data, the scanned image, and the sheet generation order data is received (YES in step S5201), the processing proceeds to step S5202. If none of image data, a scanned image, and sheet generation order data is received (NO in step S5201), the processing returns to step S5201.

In step S5202, the CPU 256 stores the received data in the memory 257 or the HDD 258.

In step S5203, the CPU 256 determines whether image data is received. If image data is received (YES in step S5203), the processing proceeds to step S5201. If a scanned image or sheet generation order data is received (NO in step S5203), the processing returns to step S5204.

In step S5204, the CPU 256 determines whether a scanned image is received. If a scanned image is received (YES in step S5204), the processing proceeds to step S5207. If sheet generation order data is received (NO in step S5204), the processing proceeds to step S5205.

In step S5205, the CPU 256 determines whether a sheet to be subsequently processed in the sheet generation order data 2571 in the memory 257 is to be scanned. If the sheet is to be scanned (YES in step S5205), the processing proceeds to step S5206. If the sheet is not to be scanned (NO in step S5205), the processing returns to step S5201.

In step S5206, the inspection reference data generation unit 2562 to be executed by the CPU 256 generates the inspection reference data 2582 based on the image data 2581 in the HDD 258 and the sheet generation order data 2571 in the memory 257, and stores the generated inspection reference data 2582 in the HDD 258. Then, the processing returns to step S5201.

In step S5207, the inspection processing unit 2563 to be executed by the CPU 256 determines whether the subsequent sheet is to be inspected with reference to the sheet generation order data 2571 in the memory 257. If the subsequent sheet is to be inspected (YES in step S5207), the processing proceeds to step S5208. If the subsequent sheet is not to be inspected (NO in step S5207), the processing returns to step S5201.

In step S5208, the inspection processing unit 2563 to be executed by the CPU 256 performs an inspection by comparing the inspection reference data 2582 in the HDD 258 with the scanned image from the image scanning apparatus 109, and then the processing proceeds to step S5209.

In step S5209, the inspection processing unit 2563 to be executed by the CPU 256 records the inspection determination result, and then the processing returns to step S5201. The stored inspection determination result may be displayed on the display 260.

As described above, the finished quality of printed materials can be accurately inspected even when the sequence of the reference images (image data) registered in the inspection apparatus 112 does not match the sequence (layout) of the images to be formed on sheets by the image forming apparatus 101.

In the present embodiment, one piece of print data transmitted from the external controller 102 is used for registration of the reference image and printing, but instead print data for the reference image and print data for printing may be separately input from the external controller 102.

As another embodiment, a method for registering pieces of image data arranged based on a determined sheet generation order as reference images in the inspection apparatus 112 can be employed. In this case, when inspection processing is to be performed again on image data which has been registered as a reference image, with a changed print setting, the processing needs to go back to registration of a reference image and then be re-started. On the other hand, in the present embodiment, if the sequence of images to be formed on sheets by the image forming apparatus 101 is determined, a notification about the sheet generation order data is provided to the inspection apparatus 112. Then, the inspection apparatus 112 performs an inspection by rearranging the sequence of reference images registered in the inspection apparatus 112 in the sheet generation order provided in the notification. Accordingly, in a case where inspection processing is to be performed again on the image data which has been already registered as a correct answer image with a changed print setting, the inspection processing can be performed by reusing the registered reference image without registering a reference image again.

In the first embodiment, the correction image sheet is discharged onto the discharge tray 324 of the sensing unit 108 that is located on the upstream side of the image scanning apparatus 109. Alternatively, the correction image sheet may be discharged onto the escape tray 346 on the downstream side of the image scanning apparatus 109, so that it is possible to prevent the sheet on which the correction image is printed from being included in an original merged document. This configuration will be described below as a second embodiment.

Figure 6:
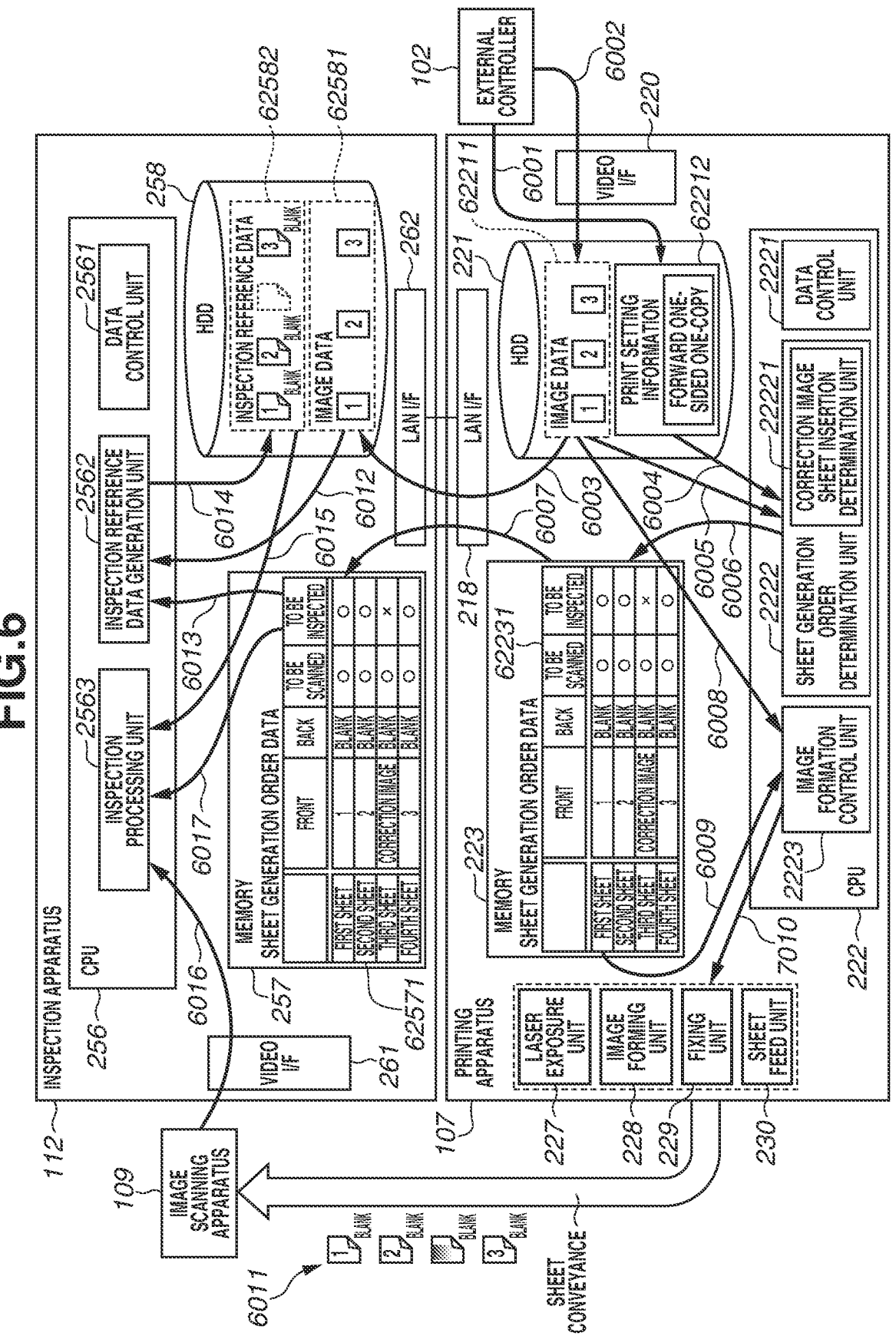
FIG. 6 illustrates a data flow according to the second embodiment.

Descriptions of components of the second embodiment that are similar to those of the first embodiment are omitted. FIG. 6 illustrates a data flow in each of the printing apparatus 107 and the inspection apparatus 112 according to the second embodiment.

The printing apparatus 107 receives print setting information 62212 from the external controller 102 via the LAN I/F 218, and receives image data 62211 from the external controller 102 via the video I/F 220. The image data 62211 and the print setting information 62212 are stored in the HDD 221 as indicated by arrows 6001 and 6002, but instead may be stored in the memory 223. This reception and storage processing is performed by the data control unit 2221 to be executed by the CPU 222.

Further, the data control unit 2221 transmits the image data 62211 to the inspection apparatus 112 via the LAN I/F 218 as indicated by an arrow 6003.

The sheet generation order determination unit 2222 to be executed by the CPU 222 generates sheet generation order data 62231 based on the image data 62211 and the print setting information 62212 in the HDD 221, and stores the generated sheet generation order data 62231 in the memory 223 as indicated by arrows 6004, 6005, and 6006. In FIG. 6, the sheet generation order data 62231 is stored in the memory 223, but instead may be stored in the HDD 221.

The sheet generation order determination unit 2222 includes the correction image sheet insertion determination unit 22221 that determines whether to insert the sheet on which the correction image is printed (hereinafter referred to as the correction image sheet) at predetermined intervals.

The sheet generation order determined by the sheet generation order determination unit 2222 indicates the order of sheets to be conveyed through the sheet conveyance path 315 of the printing apparatus 107. The image scanning apparatus 109 sequentially scans the sheets conveyed through the sheet conveyance path 333 in the determined order of sheets.

FIG. 6, the image data 62211 indicates three pages of documents, and the print setting information 62212 indicates setting information "forward one-sided one-copy".

Assume that the correction image sheet insertion determination unit 22221 determines that the correction image sheet is inserted at a position corresponding to the third sheet.

As a result, the sheet generation order determination unit 2222 determines the sheet generation order as follows:

First sheet (front: first page of image data 62211, back: blank);

Second sheet (front: second page of image data 62211, back: blank);

Third sheet (front: correction image, back: blank); and

Fourth sheet (front: third page of image data 62211, back: blank). Specifically, the sheet generation order determination unit 2222 performs processing for determining a location on a recording sheet (on a sheet) where image data including a plurality of pages on is to be arranged such that the first page of image data is located on the front side of the first sheet.

Further, the sheet generation order determination unit 2222 determines whether each sheet is to be scanned and is to be inspected. The item "to be scanned" indicates that each sheet is conveyed to the image scanning apparatus 109 and an image on the sheet is to be scanned by the cameras 331 and 332. The symbol "o" represents a sheet to be scanned, and the symbol "x" represents a sheet not to be scanned.

The item "to be inspected" indicates whether the sheet to be scanned is to be inspected based on a comparison with inspection reference data 62582. The symbol "o" represents a sheet to be inspected, and the symbol "x" represents a sheet not to be inspected.

The data control unit 2221 transmits the sheet generation order data 62231 to the inspection apparatus 112 via the LAN I/F 218 as indicated by an arrow 6007.

The image formation control unit 2223 to be executed by the CPU 222 further determines the printing order based on the image data 62211 in the HDD 221 and the sheet generation order data 62231 in the memory 223. The CPU 222 controls the laser exposure unit 227, the image forming unit 228, the fixing unit 229, and the sheet feed unit 230 to perform an image formation process as indicated by arrows 6008, 6009, and 7010.

The image formation to be performed by controlling the laser exposure unit 227, the image forming unit 228, the fixing unit 229, and the sheet feed unit 230 can be executed on one page at a time. To increase the productivity by reducing the interval between sheets on the conveyance path, the double-sided circulation control for feeding a plurality of sheets at a time and then performing sheet feeding and re-feeding alternately is carried out.

If two sheets are fed at a time, the printing order is set as follows:

First printing order (first sheet: front);
Second printing order (second sheet: front);
Third printing order (first sheet: back);
Fourth printing order (third sheet: front);
Fifth printing order (second sheet: back);
Sixth printing order (fourth sheet: front);
Seventh printing order (third sheet: back); and
Eighth printing order (fourth sheet: back).

When printing is executed in the above-described printing order, on the printed materials as the printed sheets, printing is executed according to the arrangement locations on the sheets of the image data designated by the sheet generation order data.

The sheets (6011) on which images are formed by the printing apparatus 107 are conveyed to the subsequent-stage apparatus via the sheet conveyance path 315.

Unlike in the first embodiment, in the second embodiment, all sheets in the sheet group 6011 conveyed from the sheet conveyance path 315 are conveyed to the image scanning apparatus 109. Then, the images on the sheets are sequentially scanned by the cameras 331 and 332, and the scanned image data is transferred to the inspection apparatus 112.

Meanwhile, the inspection apparatus 112 receives the image data 62211 and the sheet generation order data 62231 from the printing apparatus 107 via the LAN I/F 262. Further, the data control unit 2561 to be executed by the CPU 256 stores the image data 62211 in the HDD 258, and stores the sheet generation order data 62231 in the memory 257. In FIG. 6, the image data 62211 is stored in the HDD 258 and the sheet generation order data 62231 is stored in the memory 257 as described above, but instead the image data 62211 and the sheet generation order data 62231 may be both stored in either one of the HDD 258 or the memory 257, or may be stored in the memory 257 and the HDD 258, respectively. The image data 62211 stored in the inspection apparatus 112 is hereinafter referred to as image data 62581, and the sheet generation order data 62231 stored in the inspection apparatus 112 is hereinafter referred to as sheet generation order data 62571.

The inspection reference data generation unit 2562 to be executed by the CPU 256 generates the inspection reference data 62582 based on the image data 62581 in the HDD 258 and the sheet generation order data 62571 in the memory 257, and stores the generated inspection reference data 62582 in the HDD 258 as indicated by arrows 6012, 6013, and 6014.

The inspection reference data generation unit 2562 generates the inspection reference data 62582 only for the sheets to be scanned as indicated by "o" in the sheet generation order data 62571.

That is, the inspection reference data 62582 is generated as follows:

First sheet (front: first page of image data 62211, back: blank);

Second sheet (front: second page of image data 62211, back: blank); and

Third sheet (front: correction image, back: blank).

Fourth sheet (front: third page on image data 62211, back: blank).

Next, the inspection processing unit 2563 to be executed by the CPU 256 performs an inspection by comparing the inspection reference data 62582 in the HDD 258, the sheet generation order data 62571 in the memory 257, and the scanned image from the image scanning apparatus 109 as indicated by arrows 6015, 6016, and 6017. The inspection processing unit 2563 performs the inspection by comparing only the sheets to be scanned in the sheet generation order data 62571. In the present embodiment, after the inspection processing is completed, the image data 62581 and the inspection reference data 62582 in the inspection apparatus 112 are deleted from the HDD 258. The image data 62211 and the print setting information 62212 in the printing apparatus 107 are also deleted.

However, the present embodiment is not limited to this example. Depending on the setting, all or a part of the data may be retained. Instead of deleting the data at once after the inspection processing on all sheets is finished, the data may be sequentially deleted. Flowcharts illustrating operations to be performed by the printing apparatus 107, the image scanning apparatus 109, the inspection apparatus 112 according to the second embodiment are similar to the flowcharts illustrated in FIGS. 5A to 5C according to the first embodiment.

As described above, even in a case where the correction image sheet is discharged onto the escape tray 346 on the downstream side of the image scanning apparatus 109, the inspection apparatus 112 can perform inspection processing by controlling sheets to be scanned and sheets to be inspected in the sheet generation order data 62231.

While, in the first and second embodiments, an example where the correction image sheet is used as a sheet with no image to be inspected, inspection processing can also be performed by similar control processing using a partition sheet with no image data, such as a blank sheet.

OTHER EMBODIMENTS

While various examples and embodiments of the present invention have been described above, the spirit and scope of the present invention are not limited to any specific descriptions in the present specification.

The present invention can also be implemented by processing in which a program for implementing one or more functions according to the above-described embodiments is supplied to a system or apparatus via a network or storage medium, and one or more processors in a computer of the system or apparatus read out and execute the program. The present invention can also be implemented by a circuit (e.g., an application-specific integrated circuit (ASIC)) for implementing one or more functions according to the embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments but is defined by the scope of the following claims.

This application claims the benefit of Japanese Patent Application No. 2022-191504, filed Nov. 30, 2022, which is hereby incorporated by reference herein in its entirety.

What is claimed is:

1. An inspection apparatus comprising:

a controller configured to:

register image data upon receiving the image data;

receive arrangement location information that is generated on a basis of the registered image data and a print setting, the arrangement location information including, for every page of the image data, (a) a first flag indicating whether a page is to be scanned, and (b) a second flag indicating whether a page is to be inspected;

register a reference image obtained by re-arranging the registered image data in an order corresponding to a sheet transport sequence indicated by the arrangement location information and by excluding any page whose second flag indicates that inspection is not to be performed;

in a case where the arrangement location information is changed, update the reference image by re-arranging the registered image data without re-registering the image data; and perform an inspection on a printed material on which the image data is printed, upon receiving a scanned image obtained by scanning the printed material, based on the scanned image and the reference image, wherein the arrangement location information including the first flag and the second flag enables the controller to determine at least whether to perform the scanning and/or the inspection for each page.

2. The inspection apparatus according to claim 1, wherein the image data includes a plurality of pages to be printed on one or more recording sheets, and the arrangement location information indicates an arrangement location of each page of image data on the one or more recording sheets.

3. The inspection apparatus according to claim 1, wherein the arrangement location information indicates an arrangement location of the image data on a recording sheet such that the image data is printed on the recording sheet based on the print setting.

4. The inspection apparatus according to claim 1, further comprising a storage unit configured to store the image data and the reference image, wherein the reference image is an image obtained by rearranging the image data stored in the storage unit based on the arrangement location information.

5. The inspection apparatus according to claim 1, wherein in the inspection, the printed material is inspected based on a comparison between the reference image and the scanned image and the second flag included in the arrangement location information.

6. The inspection apparatus according to claim 1, wherein the print setting is a setting for determining an arrangement location of the image data on a recording sheet.

7. The inspection apparatus according to claim 1, wherein the print setting includes setting information about a printing order, a print surface, a number of copies, and a page layout.

8. The inspection apparatus according to claim 1, wherein the image data differs from the reference image in a sequence of at least one image.

9. The inspection apparatus according to claim 1, wherein the arrangement location information includes information indicating an arrangement location of a sheet to be inserted, and wherein the sheet to be inserted is not to be inspected as indicated by the second flag.

10. A control method for an inspection apparatus, comprising:

registering image data upon receiving the image data;

receiving arrangement location information that is generated on a basis of the registered image data and a print setting, the arrangement location information including, for every page of the image data, (a) a first flag indicating whether a page is to be scanned, and (b) a second flag indicating whether a page is to be inspected;

registering a reference image obtained by re-arranging the registered image data in an order corresponding to a sheet transport sequence indicated by the arrangement location information and by excluding any page whose second flag indicates that inspection is not to be performed;

in a case where the arrangement location information is changed, updating the reference image by re-arranging the registered image data without re-registering the image data; and performing an inspection on a printed material on which the image data is printed, upon receiving a scanned image obtained by scanning the printed material, based on the scanned image and the reference image, wherein the arrangement location information including the first flag and the second flag enables the inspection apparatus to determine at least whether to perform the scanning and/or the inspection for each page.

11. An inspection system including a printing apparatus, an inspection apparatus, and an image diagnosis unit configured to identify a malfunctioning portion in the inspection system based on a diagnostic chart inserted into a printed material, wherein the inspection system includes a controller configured to:

generate arrangement location information of image data and a print setting, the arrangement location information including a scan-required flag and an inspect-required flag for each page; and perform an inspection on the printed material on which the image data is printed, upon receiving a scanned image obtained by scanning the printed material, based on the scanned image and a reference image generated by re-arranging the image data according to the arrangement location information while excluding pages not to be inspected, wherein, in generating the arrangement location information, information indicating that the inspection is not performed is added to the arrangement location information corresponding to the diagnostic chart.

12. The inspection system according to claim 11, further comprising a scanning apparatus configured to scan the printed material on which the image data is printed, wherein the printed material is conveyed from the printing apparatus via a conveyance path and passes through the image diagnosis unit and the scanning apparatus, and a scanned image obtained by scanning the printed material by the scanning apparatus is used for the inspection.

13. The inspection system according to claim 11, wherein the image diagnosis unit includes a discharge unit configured to discharge the diagnostic chart used for image diagnosis, and wherein, in generating the arrangement location information, information indicating that scanning is not performed by the scanning apparatus and information indicating that the inspection is not performed are added to the arrangement location information corresponding to the diagnostic chart to be discharged by the discharge unit.

14. A control method for an inspection system including at least a printing apparatus, an inspection apparatus, and an image diagnosis unit, the control method comprising:

controlling the inspection apparatus according to the control method of claim 10;

generating the arrangement location information of the image data and the print setting, the arrangement location information including a scan-required flag and an inspect-required flag for each page; and performing an inspection on the printed material on which the image data is printed, upon receiving a scanned image obtained by scanning the printed material, based on the scanned image and a reference image generated by re-arranging the image data according to the arrangement location information while excluding pages not to be inspected, wherein, in generating the arrangement location information, information indicating that the inspection is not performed is added to the arrangement location information corresponding to the diagnostic chart.

15. A non-transitory computer-readable storage medium storing a computer program comprising instructions that, when executed by at least one processor of an inspection apparatus, cause the inspection apparatus to carry out the control method according to claim 10.

* * * * *